Dec. 3, 1929.   L. E. BARTON   1,738,346
OSCILLATION GENERATOR
Filed Dec. 14, 1926
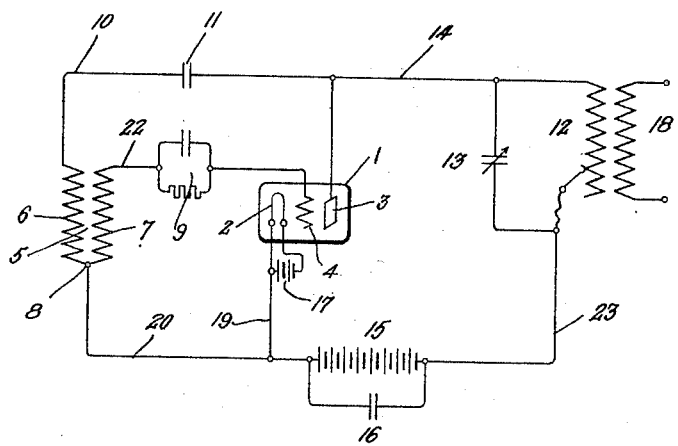
Inventor
Loy E. Barton
by
His Attorney Patented Dec. 3, 1929

1,738,346

UNITED STATES PATENT OFFICE

LOY E. BARTON, OF SCHENECTADY, NEW YORK, ASSIGNOR TO GENERAL ELECTRIC COMPANY, A CORPORATION OF NEW YORK

OSCILLATION GENERATOR

Application filed December 14, 1926. Serial No. 154,811.

My invention relates to alternating current generators, particularly of the electron discharge type, and it has for its purpose to provide a generator which is simple in its circuit arrangement and which has the property of efficiently generating a broad range of frequencies.

More particularly my invention relates to alternating current generators of the type described in Patent #1,544,202 issued June 30, 1925, to W. C. White. It has for its purpose so to improve generators of this type that they may be more economically constructed and will operate more efficiently, particularly at the lower frequencies.

The novel features which I believe to be characteristic of my invention are set forth with particularity in the appended claims. My invention itself, however, both as to its organization and method of operation will best be understood by reference to the following description taken in connection with the accompanying drawing, in which I have illustrated one form of my invention.

In the drawing, 1 denotes an electron discharge device of the common type having a cathode 2, an anode 3 and a grid 4, 5 denotes a feed back transformer of the high impedance iron core type in which one side of the primary winding 6 and secondary 7 are connected together at the point 8 and through conductors 20 and 19 of the cathode 2. The opposite side of the secondary winding 7 is connected to the grid 4 by means of the conductor 22 through the usual grid leak and condenser combination 9. The primary 6 of the feed back transformer is connected through a conductor 10 and a blocking condenser 11 to the anode 3. The main oscillatory circuit of my generator is made up of the variable inductance 12 connected in parallel with a variable condenser 13, altho it is to be understood that any convenient form of tuning arrangement may be employed. One side of this combination is connected through a conductor 14 directly to the anode of the electron discharge device. The other side of this combination is connected through a source of direct current potential 15 and conductor 19 to the cathode 2. A condenser 16 is connected across the source of direct current potential 15 to permit the passage of the high frequency current and to shunt the same out of the source 15. The cathode 2 may be heated from any suitable source such as the battery 17. A secondary coil 18 is provided which is inductively coupled with variable inductance 12 in order to provide an output circuit for the alternating current energy. To this coil may be connected any load circuit to which it is desired to supply oscillatory power. It is, of course, to be understood that any other suitable means may be employed for connecting the load circuit to the oscillatory circuit.

It is seen that with this arrangement the main oscillatory circuit comprises inductance 12 and a capacity 13 or other suitable arrangement of inductance and capacity and that oscillations are excited in this circuit through a circuit comprising the space between the cathode 2 and anode 3 of the electron discharge device, conductor 14, oscillatory circuit 12, 13, conductor 23, condenser 16, conductor 19, back to cathode 2. Due to the fact that the transformer 5 has very high impedance windings a very small amount of oscillatory energy will be transferred through the circuit including conductor 20, primary winding 6 of the transformer 5, conductor 10, condenser 11 to the anode 3. This being the case only a very small amount of energy will be transferred back into the input circuit of the electron discharge device which comprises the secondary of the transformer 7, conductor 22, grid leak and condenser combination 9 to the grid. Since the energy which passes through the high impedance feed back coils is very small no turning of these circuits is necessary. At the same time the energy transferred back into the input circuit although small is sufficient to maintain an efficient oscillating condition in the tube circuits.

Thus it may be seen that with this circuit the main oscillatory circuit 12, 13, of the generator is substantially isolated from the feed back transformer 5, and that a very small amount of the energy of the oscillatory circuit 12, 13, is fed back to the input circuit of the electron discharge device. With this arrangement a very broad range of frequencies may be obtained by adjusting the constants of the oscillatory circuit 12, 13 and practically a pure sine wave may be obtained throughout the whole range.

My invention has a further advantage, and one which has not been obtained in the patent mentioned or in the prior art, in that the anode potential is applied through the oscillatory circuit 12, 13, rather than through the windings of the feed back transformer 5.

Since the windings of the transformer 5 carry no direct current this transformer may be constructed without regard to direct current considerations. Both the windings and the core may be greatly reduced in size resulting in a very small closely coupled iron core transformer, designed entirely according to principles of alternating current theory. The resulting construction is an iron core transformer which may be more cheaply constructed than those which have been necessary heretofore and one which improves the efficiency of the circuit as a whole.

While I have illustrated and described only one embodiment of my invention it will be obvious that my invention is by no means limited to the particular embodiment indicated, but that many modifications in the circuit connections employed may be made without departing from the scope of my invention as set forth in the appended claims.

What I claim as new and desire to secure by Letters Patent of the United States, is:

1. The combination in a system for producing electrical oscillations of an electron discharge device having a cathode, an anode and a grid, a circuit connected between said cathode and said anode comprising an oscillation circuit and a source of current, a non-resonant circuit between cathode and anode comprising capacity and inductance, a separate circuit between cathode and grid and a coupling between the inductance in the second circuit between cathode and anode and the circuit between cathode and grid, the frequency of the oscillations produced being determined principally by the constants of the oscillation circuit.

2. The combination in a system for producing electrical oscillations of an electron discharge device having a cathode, an anode and a grid, a circuit connected between said cathode and said anode including an oscillation circuit and a source of current, a second circuit between cathode and anode including an inductance, and a separate circuit between cathode and grid containing an inductance which is coupled to the inductance in said second circuit between cathode and anode, the frequency of the oscillations being determined principally by the constants of said oscillation circuit and said first-mentioned inductance offering a high impedance to current of the frequency produced thereby to limit the load on said oscillatory circuit resulting from grid excitation to a desired value.

3. The combination in a system for producing electrical oscillations of an electron discharge device having a cathode, an anode and a grid, a circuit between said cathode and said anode including an oscillation circuit and a source of current, a non-resonant separate circuit between said cathode and said anode, a separate circuit between said grid and said cathode, said separate circuit between said cathode and said anode being closely coupled to said separate circuit between said grid and said cathode in order to supply to the circuit between grid and cathode energy from the circuit between anode and cathode for maintaining oscillations in the system the frequency of which is determined by the constants of the oscillation circuit.

4. In an oscillation generator the combination of an electron discharge device having an anode, a cathode and a grid, a circuit connected between said anode and said cathode including an oscillation circuit and a source of current, a transformer having a primary winding and a secondary winding one side of said primary winding being connected directly to said cathode, the opposite side of said primary winding being connected through a condenser to said anode, said secondary winding being connected in circuit between said grid and said cathode, the circuit between said anode and grid comprising the primary and secondary windings of said transformer being non-oscillatory.

In witness whereof, I have hereunto set my hand this 13th day of December, 1926.

LOY E. BARTON.